United States Patent
Chszaniecki

(12) 
(10) Patent No.: US 6,550,954 B1
(45) Date of Patent: Apr. 22, 2003

(54) METHOD FOR PRODUCING A COMPOUND FROM A FLOWABLE PLASTIC MATERIAL AND A SOLID FIBER CORE BY MEANS OF EXTRUSION AND DEVICE FOR CARRYING OUT SAID METHOD

(75) Inventor: Siegfried Chszaniecki, Hannover (DE)

(73) Assignee: Berstorff, GmbH, Hannover (DE)

( * ) Notice: Subject to any disclaimer, the term of this patent is extended or adjusted under 35 U.S.C. 154(b) by 0 days.

(21) Appl. No.: 09/868,820
(22) PCT Filed: Dec. 6, 1999
(86) PCT No.: PCT/DE99/03949
§ 371 (c)(1),
(2), (4) Date: Jun. 21, 2001
(87) PCT Pub. No.: WO00/37234
PCT Pub. Date: Jun. 29, 2000

(30) Foreign Application Priority Data

Dec. 22, 1998 (DE) .......................... 198 60 550

(51) Int. Cl.$^7$ ................................................ B29B 15/10
(52) U.S. Cl. .................. 366/76.6; 425/113; 118/420
(58) Field of Search ................... 366/76.1, 76.5, 366/76.6, 79, 83; 425/113; 264/122; 118/420

(56) References Cited

U.S. PATENT DOCUMENTS

| 4,848,915 | A | * | 7/1989 | Fintel .......................... 366/76.2 |
| 4,883,625 | A | * | 11/1989 | Glemet et al. ............... 264/136 |
| 5,110,275 | A | | 5/1992 | Scheuring .................... 425/113 |
| 5,653,534 | A | * | 8/1997 | Matsumoto et al. ........ 366/76.1 |
| 6,186,769 | B1 | * | 2/2001 | Hawley ....................... 264/136 |
| 6,221,293 | B1 | | 4/2001 | Brussel et al. ............... 264/136 |
| 6,431,847 | B1 | * | 8/2002 | Hawley et al. .............. 425/113 |

* cited by examiner

Primary Examiner—Tony G. Soohoo
(74) Attorney, Agent, or Firm—Cohen, Pontani, Lieberman & Pavane

(57) ABSTRACT

Continuous fibers are led through a roller nip which is formed between a pair of wetting rollers which are driven in opposite rotational directions and the surface of which has a coating of the flowable plastic material in a thickness which is sufficient for the constant filling of the roller nip with the plastic material. The wetted fibers are fed to the plastic material in the extrusion chamber, and the continuous fibers are mixed with the plastic material in the extrusion chamber. A device for carrying out the method includes a screw-type extruder having an extrusion chamber surrounded by an extruder barrel which has, in addition to the entry opening and the exit opening for the extruded plastic material, a lateral opening for the feeding in of continuous fiber material, and a wetting device for the wetted fiber material to be fed in, the outlet of which is in transporting connection with the lateral opening.

17 Claims, 1 Drawing Sheet

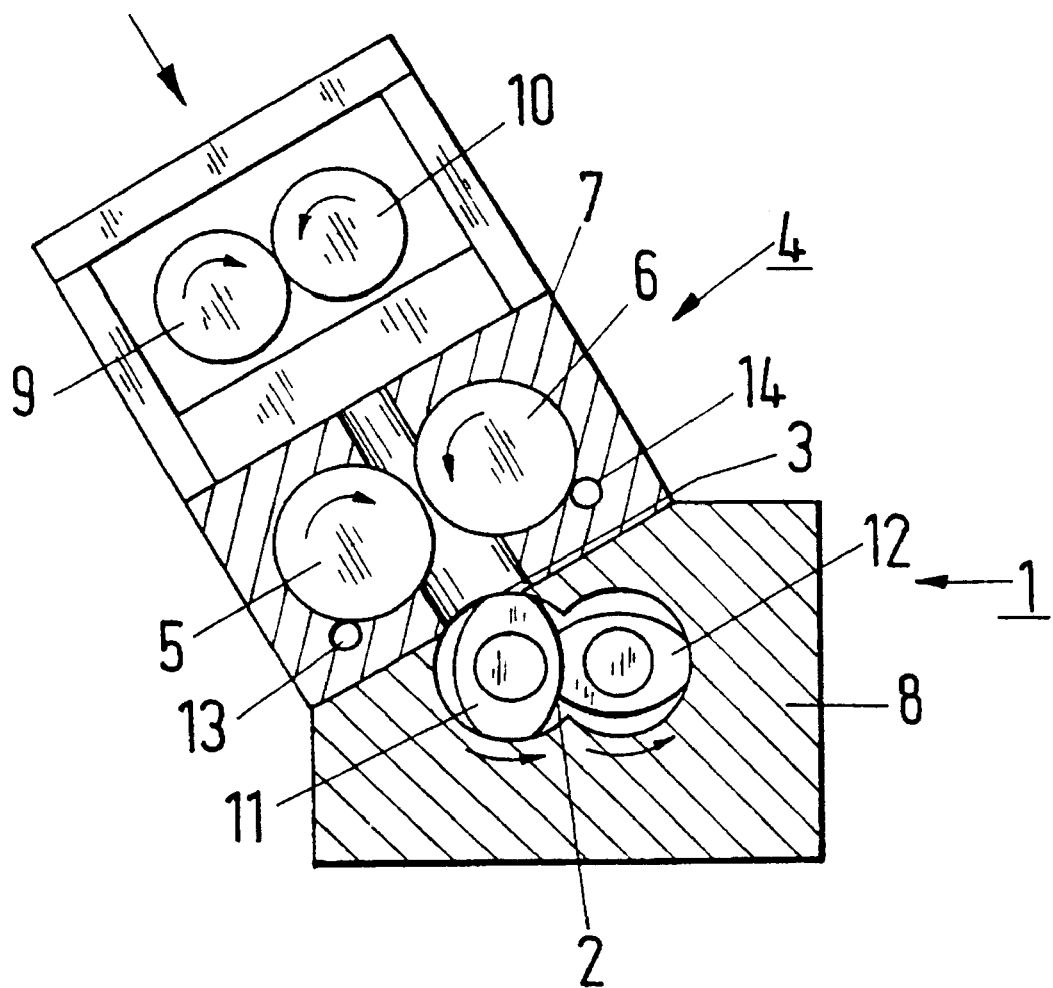

METHOD FOR PRODUCING A COMPOUND FROM A FLOWABLE PLASTIC MATERIAL AND A SOLID FIBER CORE BY MEANS OF EXTRUSION AND DEVICE FOR CARRYING OUT SAID METHOD

BACKGROUND OF THE INVENTION

1. Field of the Invention

The invention relates to a method for producing a compound from a flowable plastic material and a solid fiber core wherein continuous fibers of reinforcing material which are wetted with plastic material are fed to the plastic material in the mixing zone of an extrusion chamber. Furthermore, the invention relates to a device for carrying out this method.

2. Description of the Related Art

U.S. Pat. No. 6,221,293 discloses a method for producing a compound from a plastic material and a solid fiber core in which a heated screw-type extruder is used, into which continuous fibers are drawn by drawing themselves in, are cut up there and mixed with the plastic material, so that subsequently a finished fiber compound can be delivered. To be able to keep the length of the mixing zone required for intensive mixing with the flowable plastic material in the extruder as short as possible, the continuous fibers are wetted in an impregnating die with the plastic material being used before they enter the extruder.

With regard to the impregnating die, reference is made to a commercially available device which is described in U.S. Pat. No. 4,883,625. This known device for wetting continuous fiber material is designed in the form of an extrusion die which has a continuous channel for the leading through of the fiber material. In the initial region of this channel, two flow channels for the feeding of flowable plastic material to the continuous fiber material end. The channel does not proceed in a straight line in the longitudinal direction, but instead has a number of kinks in the downward or upward direction, so that, when it is being led through, the fiber material is in each case deflected around corresponding edges. The intended effect of this is to ensure that the fiber material is wetted as uniformly and completely as possible. deflected around corresponding edges. The intended effect of this is to ensure that the fiber material is wetted as uniformly and completely as possible.

SUMMARY OF THE INVENTION

The object of the present invention is to develop a method of the generic type to the extent that uniform and complete wetting of the fiber material is ensured in as simple a way as possible. At the same time, it is intended that a compound which deliberately contains a particularly high proportion of very long fibers can be produced, to ensure a high breaking strength of the finished parts which can be produced from this compound. Furthermore, a device for carrying out this method is to be specified.

The invention is based on the idea that the production of a compound from a flowable thermoplastic material and a fixed fiber core of a reinforcing material takes place by extruding the materials being used from an extrusion chamber. The flowable plastic material may in principle also be thermosetting liquid polymers such as for instance polyester resins. However, thermoplastic which are plasticated in the extrusion chamber by supplying heat, for example polyethylene or polypropylene, are preferably used. Any desired materials may be used as the fiber material for reinforcing the flowable plastic material used in the sense of a matrix material. They are preferably glass fibers. The fiber reinforcing material is fed in the form of continuous fibers to the plastic material which is located in the extrusion chamber and already flowable and is mixed with the latter. Before the continuous fibers are introduced into the extrusion chamber, they are wetted with an amount of the intended flowable plastic material that is small in comparison with the amount of plastic material in the extruder. This prior wetting makes it possible to minimize the mixing work in the extruder to achieve a distribution of the fibers that it is as uniform as possible. As a result, the fibers fed in, which tend to break or tear under the action of the mixing tool used, can maintain a comparatively great length. The longer and more intensely the mixing work is carried out, the shorter the individual pieces of fiber become. In order that the products produced by further processing from the compound produced according to the invention achieve as high a breaking strength as possible, it is important however that the length of the fibers remains as long as possible. Without adequate wetting of the continuous fibers fed in, a much longer mixing operation would have to be carried out.

To achieve complete wetting of the continuous fibers with the flowable plastic material, the invention provides that the continuous fibers are led through a roller nip which is formed between a pair of wetting rollers driven in opposite rotational directions. In this arrangement, the surface of these wetting rollers has a coating of the plastic material of the matrix material in flowable form in a thickness sufficient for the constant filling of the roller nip with the plastic material. By leading the continuous fibers through the roller nip, the continuous fibers are inevitably brought into extremely intensive contact with the flowable plastic material and are consequently wetted completely with the plastic material on the surface in a very uncomplicated way.

In principle, it is possible to produce the flowable plastic material for coating the wetting rollers with a separate extruder and feed it to the surface of the wetting rollers. However, it is particularly advantageous to take the flowable plastic material required for this purpose from the extrusion chamber used for mixing with the continuous fibers as a partial stream at a point at which the plastic material is already flowable but has not yet been mixed with the fibers.

On account of their particularly good mixing properties, multi-screw extruders, preferably twin-screw extruders, are suitable for the production of the compound. In principle, however, single-screw extruders can also be used. The feeding in of the wetted continuous fibers expediently takes place in the region of the mixing zone of such an extruder. This mixing zone need have only a comparatively short length for adequate mixing with the matrix material.

To achieve particularly good wetting of the continuous fibers, it is recommendable to operate the wetting rollers in each case with circumferential roller speeds that are different from each other. In this way, a friction occurs in the roller nip, leading to fibrillation of the fiber material. This allows the individual fibers of the fiber strands fed in to be brought into particularly intensive contact with the flowable plastic material in the roller nip and be completely enveloped. The fibrillation successfully allows fibers that are sticking together, for instance due to "coating", to be broken up and to achieve wetting of the "individual fibers". Different circumferential roller speeds can be achieved for example with the same rotational drive speed by choosing correspondingly different roller diameters. The circumferential roller speeds are realized, however, by corresponding setting and regulation of different rotational speeds of the wetting rollers.

To ensure orderly feeding of the continuous fibers to the wetting rollers, it is recommendable to lead the continuous fibers initially over a pair of drawing-in rollers, rolling on each other, and to pass them from these rollers into the roller nip of the wetting rollers. The drawing-in rollers, like the wetting rollers, each rotate oppositely in relation to the other, in order to achieve the material transport in the desired direction.

The device according to the invention for carrying out the method described above has as a major part a screw-type extruder, the extrusion chamber of which, surrounded by an extruder barrel, has in addition to the two openings for the entry of the plastic material of the matrix material and the exit opening for the extruded material a further lateral opening which serves for the feeding in of the continuous fiber material. The opening for the fiber material consequently lies between the entry opening and the exit opening for the plastic material, to be precise generally much closer to the exit opening. A further important part of the device is the wetting device for the fiber material. The outlet of this wetting device is in this case in transporting connection with the opening for the continuous fiber material in the extruder barrel. According to the invention, the wetting device has at least one pair of interacting wetting rollers, which are driven such that they rotate in opposite directions. In principle, it is also possible to arrange a number of pairs of such wetting rollers one behind the other or one next to the other. However, in general it is advisable to limit the wetting rollers to a single pair. The roller nip existing between the wetting rollers forms the outlet of the wetting device. In the region of the periphery of the wetting rollers, i.e. in the vicinity of their circumference, a feed for the flowable plastic material required for the wetting is arranged in such a way that the outer surface of the wetting rollers is constantly coated with the flowable plastic material during operation.

It is recommendable in the interests of a compact design to mount the wetting rollers in an enclosing housing which is firmly connected to the extruder barrel. This consequently means that this housing is arranged in the region of the lateral opening for the feeding in of the fiber material. The lateral opening is expediently provided in the region of the mixing zone of the screw-type extruder. In front of the housing in which the wetting rollers are mounted there is preferably also arranged a pair of drawing-in rollers, driven such that they rotate in opposite directions, by means of which the continuous fibers of the fiber material can be led in a controlled manner into the roller nip of the wetting rollers.

In principle, the screw-type extruder may have a single screw in the extrusion chamber. Better mixing is achieved, however, on multi-screw extruders. The use of twin-screw extruders is particularly preferred, the screws of the twin-screw extruder preferably being driven such that they rotate in opposite directions.

To create friction in the roller nip to assist complete wetting of the fiber material, in principle wetting rollers with different diameters may be used, so that they can be driven at the same rotational speed although different circumferential speeds at the outer roller surface are desired. It goes without saying that it is also possible with diameters of the wetting rollers that are the same as one another for desired different circumferential roller speeds to be achieved by a different gear transmission in the drive of the individual rollers. It is recommendable to design the rotary drives of the wetting rollers in such a way that their circumferential speed can be set and regulated independently of one another. This can be achieved in the simplest way by the rotary drives of the wetting rollers each being designed such that they are completely separate from one another.

With regard to the feed for the flowable plastic material to the wetting rollers, it is regarded as advantageous to design these feeds each as a branch channel which branches off upstream in the transporting direction of the screws of the screw-type extruder of the opening for the feeding of the fiber material from the extrusion chamber and ends openly in the direct proximity of the outer surface of the respectively assigned wetting roller, so that, as a consequence of the pressure in the flowable plastic material brought about by the screw or screws, a partial stream of this plastic material is applied through the branch channel to the outer surface of the wetting rollers.

BRIEF DESCRIPTION OF THE DRAWING

The sole FIGURE is a schematic cross-section of an extruder according to the invention.

DETAILED DESCRIPTION OF THE PRESENTLY PREFERRED EMBODIMENTS

The FIGURE shows in cross section a screw-type extruder 1, which is designed as a twin-screw extruder with the two screws 11 and 12. As indicated by the two rotational arrows entered, the two screws 11, 12 are driven in a preferred way such that they rotate in the same direction. The extrusion chamber of the screw-type extruder is denoted by the reference numeral 2, while the extruder barrel bears the reference numeral 8. In the region of the mixing zone of the screw-type extruder 1, the extruder barrel 8 has a lateral opening 3 toward the extrusion chamber 2. Arranged above this opening 3 is a housing 7, which is firmly screwed directly to the extruder barrel 8. Rotatably mounted in this housing 7 are two wetting rollers 5, 6, which have a cylindrical outer surface and the same diameter. The axes of rotation of these wetting rollers 5, 6, which belong to the wetting device 4, lie parallel to the longitudinal axis of the two screws 11, 12. They are driven by separate, variable-speed motor drives in opposite directions of rotation, the rotational speed of the wetting roller 5 being set to be slightly different than the rotational speed of the wetting roller 6, to create a certain degree of friction in the roller nip of the wetting rollers 5, 6 lying close to each other. The rotational direction of the wetting rollers 5, 6 and the roller nip are set such that a strand of continuous fibers of a glass fiber material, which is not represented in any more detail but is fed in the direction of the depicted arrow over the wetting device 4, is conveyed in a specifically directed manner through the opening 3 into the extrusion chamber 2. To accomplish controlled feeding of the glass fiber material, two drawing-in rollers 9, 10 are also rotatably arranged above the two wetting rollers 5, 6 and are driven such that the strand of the continuous fibers enters the roller nip of the wetting rollers 5, 6 in a straight line. In order that the desired complete wetting with the flowable plastic material of the matrix material takes place in the roller nip between the two wetting rollers 5, 6, the outer surface of the wetting rollers 5, 6 must in each case be coated with an adequate amount of flowable plastic material for the latter to fill the roller nip sufficiently. Provided for this purpose in an advantageous development of the invention there is in each case a branch channel 13, 14, which branches off from the extrusion chamber 2 in a way not shown at a point where already flowable plastic material is present in the extrusion chamber 2, and leads through the extruder barrel 8 and through the frame 7 to the outer surface of the respective wetting roller 5, 6 and openly ends there. As a result, a partial stream of the flowable plastic material can be branched off from the extrusion chamber 2 and led up to the wetting rollers 5, 6. The flowable plastic material is discharged at the outer surface of the wetting rollers 5, 6, i.e. it issues into the nip between the outer surface of the wetting rollers 5, 6 and the corresponding cylindrical recess in the frame 7, in which the two wetting rollers 5, 6 respectively run. As a result, the flowable plastic material distributes itself in a uniform thickness under constant rotation of the two wetting rollers 5, 6 on their outer surface. The material feed through the two branch channels 13, 14 is adjusted such that the roller nip between the two wetting rollers 5, 6 is adequately filled when the strand of continuous fibers is led through.

As a result of the friction and compressing processes in the roller nip, very intensive contact occurs between the fiber material and the plastic material of the matrix material, so that complete wetting of the surface of the fiber material is ensured. The excess material of the flowable plastic material is entrained by the wetting rollers 5, 6 and can be stripped off without any problem at a corresponding edge inside the frame 7, so that it falls into the opening 3 on the extruder barrel 8 and is inevitably taken along by the screws 11, 12 of the extruder with the fiber material introduced into the opening 3 and mixes again with the main stream of plastic material. The fiber material can be conveyed into the extrusion chamber 2 in a very uniform way by the drawing-in rollers 9, 10 and the wetting rollers 5, 6.

The mixing action of the two extruder screws 11, 12 does admittedly cause repeated breakages in the fiber material. Since, however, the mixing zone for the uniform distribution of the fiber material in the matrix material of the flowable plastic material can be relatively short, the continuously fed-in fibers are predominantly maintained in a comparatively great length. The proportion of short fibers is considerably less than in the case of the previously known methods. Since the device according to the invention merely comprises individual parts which can be produced very easily and the required rotary drives are obtainable at favorable prices, the overall expenditure for setting up a device according to the invention is very low.

What is claimed is:

1. A method for producing a compound from a flowable plastic material and a solid fiber core of reinforcing material, said method comprising:

extruding the plastic material from an extrusion chamber, providing a pair of wetting rollers which are driven in opposite rotational directions, said wetting rollers having respective surfaces which form a nip between said rollers, coating said surfaces with a flowable plastic material in a thickness which is sufficient to constantly fill the roller nip with plastic material, feeding continuous fibers of reinforcing material through said nip so that said fibers are wetted with plastic material, feeding the wetted fibers to the plastic material in the extrusion chamber via a lateral opening in the extrusion chamber, and mixing the wetted fibers with the plastic material in the extrusion chamber.

2. A method as in claim 1 wherein flowable plastic material is taken from said extrusion chamber at a point upstream of said lateral opening and used to coat said surfaces of said rollers.

3. A method as in claim 1 wherein said mixing occurs in the mixing zone of a multi-screw extruder.

4. A method as in claim 1 wherein said flowable plastic material is a plasticated thermoplastic.

5. A method as in claim 1 wherein said wetting rollers are operated with different surface speeds to create friction in the nip.

6. A method as in claim 5 wherein said wetting rollers are driven at different rotational speeds.

7. A method as in claim 1 wherein said continuous fibers are fed to said nip in a controlled manner by means of a pair of drawing-in rollers rolling on each other.

8. A device for producing a compound from a flowable plastic material and a solid fiber core of reinforcing material, said device comprising:

a screw-type extruder comprising an extrusion chamber surrounded by an extruder barrel, said extrusion chamber having an entry opening for feeding in flowable plastic material, an exit opening for extruded plastic material, and a lateral opening for the feeding in of continuous fiber material, a wetting device comprising a pair of wetting rollers which are driven in opposite rotational directions, said wetting rollers having respective surfaces which form a nip between said rollers, said nip forming an outlet which is in transporting connection with the lateral opening of the extrusion chamber, and means for constantly coating the surfaces of the wetting rollers with a flowable plastic material.

9. A device as in claim 8 further comprising an enclosing housing in which said wetting rollers are mounted, said enclosing housing being fixed to said extruder barrel.

10. A device as in claim 8 further comprising a pair of drawing-in rollers which are driven to rotate in opposite directions, said drawing-in rollers being arranged for feeding continuous fibers of fiber material into the nip of the wetting rollers in a controlled manner.

11. A device as in claim 8 wherein said screw-type extruder is a twin-screw extruder.

12. A device as in claim 11 wherein said twin-screw extruder comprises a pair of screws which are driven to rotate in the same direction.

13. A device as in claim 8 further comprising means for driving said wetting rollers so that the surfaces have different speeds thereby to create friction in the nip.

14. A device as in claim 13 wherein said wetting rollers have the same diameter, said means for driving said wetting rollers comprising means for regulating their rotational speeds independently of each other.

15. A device as in claim 14 wherein said means for driving said wetting rollers comprises a respective rotary drive for each said wetting roller.

16. A device as in claim 8 further comprising a pair of branch channels which branch off of said extrusion chamber upstream of said lateral opening and end in the direct proximity of the surfaces of the respective wetting rollers.

17. A device as in claim 8 wherein said lateral opening is arranged at the mixing zone of the screw-type extruder.

* * * * *